(12) United States Patent
Lang et al.

(10) Patent No.: US 8,967,415 B2
(45) Date of Patent: Mar. 3, 2015

(54) VESSEL, IN PARTICULAR PRESSURE VESSEL

(75) Inventors: Norbert Lang, Blieskastel (DE); Stefan Schlachter, Contwig (DE)

(73) Assignee: Hydac Process Technology GmbH, Neunkirchen (DE)

( * ) Notice: Subject to any disclaimer, the term of this patent is extended or adjusted under 35 U.S.C. 154(b) by 0 days.

(21) Appl. No.: 13/261,194

(22) PCT Filed: Aug. 11, 2010

(86) PCT No.: PCT/EP2010/004894
§ 371 (c)(1),
(2), (4) Date: Feb. 28, 2012

(87) PCT Pub. No.: WO2011/026554
PCT Pub. Date: Mar. 10, 2011

(65) Prior Publication Data
US 2012/0160849 A1 Jun. 28, 2012

(30) Foreign Application Priority Data
Sep. 4, 2009 (DE) .......................... 10 2009 040 179

(51) Int. Cl.
*B65D 45/00* (2006.01)
*B65D 45/32* (2006.01)
*F16J 13/10* (2006.01)
*F16J 13/08* (2006.01)
*F16J 13/24* (2006.01)

(52) U.S. Cl.
CPC *F16J 13/10* (2013.01); *F16J 13/08* (2013.01); *F16J 13/24* (2013.01)
USPC .......................................... 220/315; 220/319

(58) Field of Classification Search
CPC ................. B65D 90/501; B65D 90/06; B65D 2543/00092; B65D 45/32
USPC ............ 220/560.05, 560.06, 567–567.3, 319, 220/203.27, 203.19, 203.29, 203.01, 582, 220/327, 325, 324; 138/90, 96 R; 251/82
See application file for complete search history.

(56) References Cited

U.S. PATENT DOCUMENTS

| 2,237,029 | A | * | 4/1941 | Fischer .................... 292/256.71 |
| 2,743,032 | A | * | 4/1956 | Snieg ............................. 220/328 |
| 3,651,829 | A | * | 3/1972 | Frantz ........................... 137/529 |
| 4,041,722 | A | * | 8/1977 | Terlesky et al. ................ 62/45.1 |
| 4,470,516 | A | * | 9/1984 | Tsou ............................. 220/319 |
| 4,579,147 | A | * | 4/1986 | Davies et al. ................. 137/854 |
| 4,580,596 | A | * | 4/1986 | Stehling ........................ 137/523 |

(Continued)

FOREIGN PATENT DOCUMENTS

| CH | 484382 | 2/1970 |
| DE | 223816 | 7/1910 |

(Continued)

*Primary Examiner* — Anthony Staschick
*Assistant Examiner* — Jennifer N Zettl
(74) *Attorney, Agent, or Firm* — Roylance, Abrams, Berdo and Goodman LLP

(57) ABSTRACT

A vessel, particularly a pressure vessel, has a tubular housing part (10) in which a cover part (12) can be secured. Support segments (18) are inserted at least in some areas in a recess (14) on the interior (16) of the housing part (10). These segments provide support to the cover part (12) when it is installed. At least one fixing device (22) ensures a releasable engagement between cover part (12) and at least one of the support segments (18).

20 Claims, 4 Drawing Sheets

(56) References Cited

U.S. PATENT DOCUMENTS

| | | | |
|---|---|---|---|
| 4,625,754 A * | 12/1986 | Wilson et al. | 137/315.32 |
| 4,874,573 A * | 10/1989 | Wood et al. | 376/272 |
| 4,921,214 A * | 5/1990 | Jernberg | 251/335.2 |
| 4,986,502 A * | 1/1991 | Ceroke | 251/216 |
| 5,038,830 A * | 8/1991 | Arnaud | 138/89 |
| 5,123,445 A * | 6/1992 | Chung-Shan | 137/606 |
| 5,125,625 A * | 6/1992 | Gooch et al. | 251/349 |
| 5,230,437 A * | 7/1993 | Kelly | 220/237 |
| 5,720,411 A * | 2/1998 | Darby et al. | 220/582 |
| 6,286,553 B1 * | 9/2001 | Morgan | 138/89 |
| 6,679,396 B1 * | 1/2004 | Foltz et al. | 220/86.2 |
| 8,171,955 B2 * | 5/2012 | David et al. | 137/543.15 |
| 8,714,175 B2 * | 5/2014 | Fetner et al. | 137/1 |
| 2009/0266816 A1 * | 10/2009 | Holroyd et al. | 220/203.01 |
| 2009/0308874 A1 * | 12/2009 | Lindner et al. | 220/560.05 |
| 2010/0024901 A1 * | 2/2010 | Sorensen | 137/487 |
| 2010/0025401 A1 * | 2/2010 | Jagemann et al. | 220/203.29 |

FOREIGN PATENT DOCUMENTS

| | | |
|---|---|---|
| DE | G8907361.4 | 9/1989 |
| DE | 39 04 816 | 8/1990 |
| DE | 42 05 867 | 9/1992 |
| DE | 42 15 232 | 11/1993 |
| DE | 603 12 344 | 9/2007 |

\* cited by examiner

VESSEL, IN PARTICULAR PRESSURE VESSEL

FIELD OF THE INVENTION

The invention relates to a vessel, in particular a pressure vessel, having a tubular housing part in which a cover part can be secured.

BACKGROUND OF THE INVENTION

DE 39 04 816 C1 discloses a pressure vessel, in particular a pressure filter vessel, comprising a cover. The cover has an edge that can be pressed in a sealing manner onto the edge of the vessel with optional interpositioning of a disk by a pressing device. The pressing device has clamps comprising ends, which grip the cover, starting from the pressure vessel. An actuated piston-cylinder system presses axially against these clamps. Since the prior art solution has a piston-cylinder system comprises a hydraulically or pneumatically operated annular cylinder with an annular piston that can be displaced upward against the ends of the clamps at the cover, the result is a fail-safe construction for the known pressure vessel solution with a pressing device. However, the pressure vessel and, in particular its associated closure system, has a complex design. The manipulation of the fastening clamps is, therefore, very time consuming.

DE 42 15 232 C2 discloses a filter, in particular in the form of a fuel filter, which can be used for aircraft fueling units. The filter comprises a filter housing with at least one inlet, one outlet connection and an opening that can be closed in a sealing manner to install and remove at least one filter insert that divides the filter housing into two internal compartments. In this case, one end of the filter insert rests against a mounting plate, which in turn has a displacement element that prevents the opening in the filter housing from closing in a sealing manner in the event that the filter insert is missing or the filter insert has been incorrectly installed. A closure cover for the filter compartment is provided with centering guides that prevent the closure cover from being fitted in an incorrect position. Furthermore, the cover is pressed, when viewed in the axial direction, against a sealing seat with screws.

SUMMARY OF THE INVENTION

An object of the invention is to provide an improved vessel, in particular a pressure vessel, permitting securing the cover part on a housing part in a fail-safe way and at the same time satisfying the objective of being able to fasten easily and quickly the cover part in a detachable manner in the housing.

This object is basically achieved with a vessel, in particular a pressure vessel, having contact segments that are inserted at least in some areas in a recess on the interior of the housing part. These contact segments provide support for the cover part in its installed state. At least one securing device ensures a detachable engagement between the cover part and at least one of the contact segments. The cover part can be easily and quickly secured in the housing part by contact segments, after the cover part has been inserted into the associated recess of the tubular housing part. Surprising to the person skilled in the art of such vessels, just a few securing devices, where appropriate just one securing device, are used to connect in an operationally safe way all of the necessary contact segments to the housing part such that the cover part is also accommodated in the housing part in a fail-safe way. The construction and installation of the contact segments into the housing part is also apparent to an assembler or operator, so that the vessel can be put into service without any major technological introduction. Moreover, the contact segments do not have to be inserted into the housing part at precisely defined installation points. Rather, it is possible to install the contact segments at any point along the circumferential edge of the housing part, provided that care is taken to ensure that there is a specified order of assembly between the cover part and the associated contact segment.

In order to be able to open and close the vessel quickly, an external end stop that lies opposite the internal end stop is formed by providing a radially extending recess in the interior of the pressure vessel wall with at least two contact segments engaging with this recess. These contact segments also make contact with the cover exterior when the pressure vessel is in the assembled state. The contact segments are arranged so as to be set apart from each other such that the cover can be held axially in an undetachable manner and without tilting. When the pressure vessel is in operation, the resulting internal pressure presses the cover part against the contact segments, which are designed as relief elements in this respect. The resulting forces are safely discharged into the housing part by the contact segments and the recess on the interior of the housing part.

Securing devices are used to secure the contact segments inside the recess. In this context, a respective securing device can be a securing pin or a securing screw that extends through at least one of the contact segments that engage at least in some areas with an assigned opening of the cover part. In addition or as an alternative, the respective securing device can be, at least in some areas, the recess on the interior of the housing part itself. Especially if the interior of the recess is provided with an inwardly tilted contact surface in the direction of the external end stop, an additional support then serves as the securing device.

In an especially preferred embodiment of the invention, the contact segments are designed as wedge-shaped strip segments and extend in total around the relevant periphery of the cover. In this case, the contact segments are designed in such an advantageous manner that they occupy an unequal tangential extent along the outer circumference of the recess of the housing part. Preferably two arc-shaped contact segments have an identical tangential extent relative to a third contact segment having a comparatively smaller tangential extent. In total, however, the three contact segments add up to a tangential extent having a radian measure of 360 degrees.

An additional preferred embodiment of the inventive solution for the vessel provides that the contact segment with the smaller tangential extent is secured on the interior of the housing part by just one single securing device, preferably, however, with two securing means inside the recess. Then the two other additional contact segments can make due without any additional securing device in the form of a securing pin or a securing screw and are secured in the recess only by the inner edge in the vessel. As a result, the contact segment with the respective securing device can be freed easily and quickly of the securing device and removed from the recess for the purpose of disassembling the additional contact segments and removing the cover part. For example, when a filter element that is supplied in the pressure vessel is consumed, it can be exchanged for a new element, provided that the pressure vessel according to the invention is designed as a pressure filter vessel. If the vessel serves only as a tank, then the securing device, like the securing pins or the securing screws, can be dispensed with. The cover part can be held in its position exclusively by the contact segments inserted into the recess. Such an installation option exists, if there is no overpressure or only a slight overpressure relative to the ambient pressure in the interior of the vessel when the cover part is installed by the contact segments.

Another preferred embodiment of the vessel according to the invention provides that when the contact segments are inserted at least in pairs into the recess of the housing part, the contact segment that is to be inserted last can be inserted into the recess in parallel to the end faces of the adjacent contact segments. When the vessel is set up in the normal orientation, the cover part can be secured and detached again by a simple traversing movement in the horizontal direction.

In an additional preferred embodiment of the vessel according to the invention, at least one spacing and/or positioning element, which is made preferably of a sheet metal strip, can be inserted between the adjacent end faces of two abutting contact segments. Such an element makes it possible to compensate for production tolerances, so that it is still possible to assemble and disassemble the vessel with its cover part in an operationally safe way.

Furthermore, an especially preferred embodiment of the vessel according to the invention provides that the cover part has at least one pressure relief element that allows a continuous release of any overpressure that may prevail in the housing part relative to the ambient pressure from the assignable contact segment when at least one of the respective securing screws is present.

This feature increases the operating safety of the operating and assembly personnel who need not be afraid that the securing device under high pressure will be inadvertently ejected toward them during the disassembly of the cover part, a situation that can otherwise lead to a significant risk of injury.

Furthermore, it is preferably provided that the cover part of the vessel has at least one sealing device in the area of the cover part's outer circumferential engagement with the housing part. In this respect, the cover part, supported on an internal shoulder of the housing part, can be guided in a sealing manner along the internal circumferential side of the housing part.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are not drawn to scale.

DETAILED DESCRIPTION OF THE INVENTION

Figure 1:
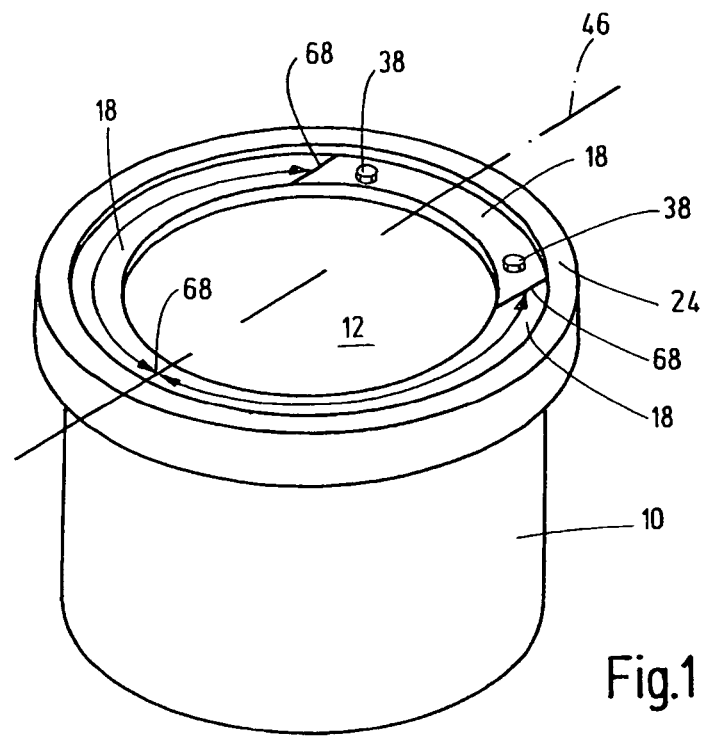
FIG. 1 is a perspective top view of the vessel with the inserted cover part, including the contact segments according to an exemplary embodiment of the invention.

The vessel, in particular the pressure vessel, has a tubular housing part 10 in which a cover part 12 can be secured. In this case, the contact segments 18 are inserted at least in some areas in an annular housing recess 14 on the interior 16 of the housing part 10 (cf. sectional view according to FIG. 3). These contact segments 18 provide support for the cover part 12 in its installed state (depicted in FIG. 3) with parts of its upper side 20. At least one securing device 22 guarantees a detachable engagement between the cover part 12 and at least one of the contact segments 18.

Figure 2:
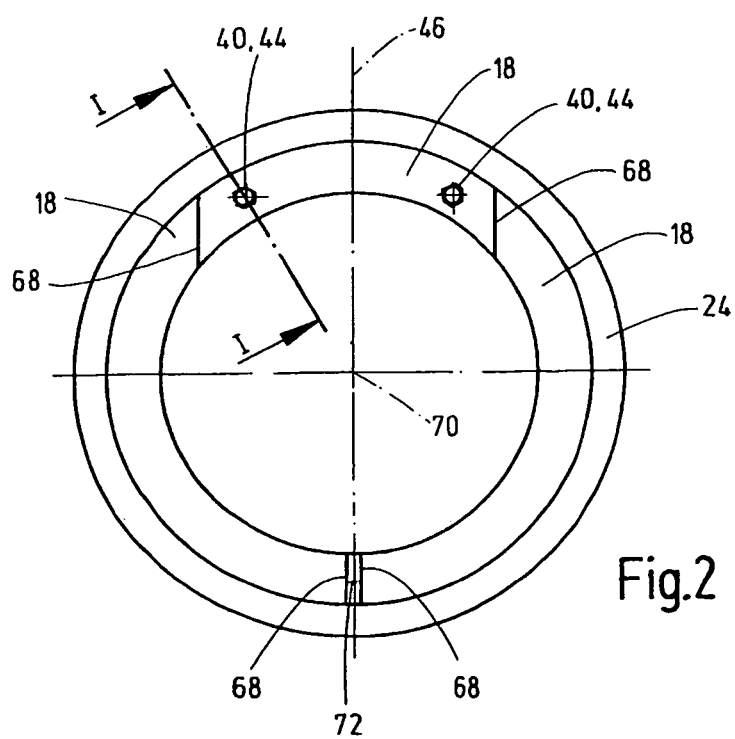
FIG. 2 is a top view of the vessel of FIG. 1.
Figure 3:
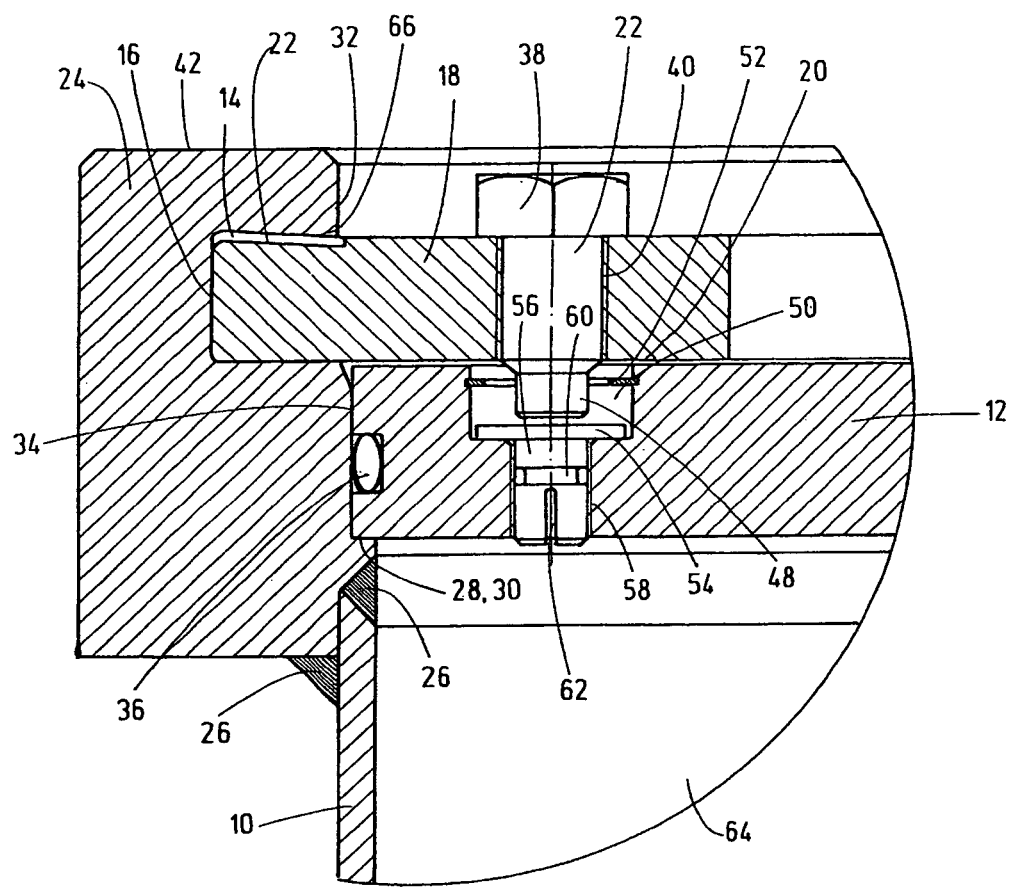
FIGS. 3 to 5 are side elevational views in section of the upper area of the vessel of FIG. 1 along line I-I of FIG. 2, according to first, second and third exemplary embodiments of the invention, respectively.

It is especially clear from FIGS. 1 and 2 that the contact segments 18 have a circular arc shape with a rectangular cross section. The relevant adjacent contact segments 18 abut each other at their end faces. As illustrated in FIG. 3, the tubular housing part 10 has an edge expansion 24 in the direction of its upper free edge. This edge expansion is connected outwardly and inwardly in a sealing manner to the cylindrical housing part 10, designed otherwise as a thin wall, by circumferential fillet welds 26. At the point of the innermost fillet weld 26 and directly above this point, the interior of the edge expansion 24 has an outwardly expanding shoulder 28 providing support for the cover part 12 with parts of the underside 30 of the cover part 12. A sealing device 36 between the internal wall 32 of the edge expansion 24 and the cylindrical external wall 34 of the cover part 12. This sealing device is accommodated, preferably as a captive sealing O-ring, in a corresponding receiving groove in the cover part 12.

In the embodiment according to FIG. 3, the securing device 22 is of securing pin or securing screw 38 that extends through a segment inside thread 40 of the contact segment 18 in the installed state. In the installed state, the screw head of the securing screw 38 remains under the above edge delimitation formed by the upper side 42 of the edge expansion 24 in order to be protected against damage and in order to help prevent, in particular, an inadvertent loosening of the securing screw 38. When viewed in FIG. 2, the securing device 22 is not illustrated therein for the sake of a simpler depiction. Rather only the drilled holes 44 and the associated segment inside thread section 40 are depicted in FIG. 2.

If the two external contact segments 18 are inserted into the annular recess 14 and moved into position, then the middle contact segment 18 can be inserted last by moving longitudinally along a central displacement axis 46. As a result of this insertion, the respective contact segments 18 are then placed in a self-retaining manner in the housing recess 14 as an essential component of the securing device 22. However, the cover part 12, which had already been introduced before the insertion of the respective contact segments 18, then has to be moved into a position relative to the contact segments 18 such that the bottom free end 48 of the securing device 22 in the form of the securing screw 38 or a securing pin can engage, according to the drawing of FIG. 3, in alignment with an annular cover recess 50. Cover recess 50 is wider than the bottom free end and extends from its upper free end at the cover part 12 and is defined upward by the bottom contact wall of the associated contact segment 18 when the cover part 12 is in the installed state, according to the drawing from FIG. 3.

Into this cover annular recess 50 is inserted a retaining element 52, constructed, for example, as a snap ring, and held by the cover part 12 with retaining element parts. Retaining element 52 projects into the annular cover recess 50 with a specifiable protrusion. The annular cover recess 50 is closed downward by a contact plate 54, which is preferably a one-piece component of a pressure relief device 56. Pressure relief element 56 can be screwed in the manner of a screw insert into a cover inside thread 58 of the cover part 12 in the region of the upper middle of the contact plate 54, for example, by means of a hexagonal socket screw (not illustrated). In this case, the central region of the inserted pressure relief device 56 has a circumferential pressure guide groove 60. At least one pressure channel 62 empties into groove 60 such that the location of such a mouth opening can also be partially interrupted by an intermediate web.

When the cover part 12 is removed, the pressure relief device 56 is used for producing a pressure reduction in the vessel interior 64 relative to the surrounding area, provided that the removal of the respective securing device 22 in the form of the respective securing screw 38 allows the cover part 12 to be supported exclusively then only by the contact segments 18 held in this respect by the recess 14 inside the edge expansion 24 as the remaining securing device 22. In this case, the hexagonal socket screw serves to unscrew the contact plate 54 out of the inside cover thread 58 with the adjoining engagement pin. The overpressure prevailing in the vessel interior 64 can then escape through the pressure channel 62 and the pressure guide groove 60 into the environment via the respective drilled holes 44 in the contact segment 18. For such a pressure guide, the diameter of the contact plate 54 is chosen somewhat smaller than the diameter of the annular cover recess 50.

If the insert in the form of the pressure relief element 56 is used, then the securing screw 38 can be replaced with a securing pin (not illustrated in detail), which engages with the annular cover recess 50 in the cover part 12 without the threaded connection by way of the drilled hole 44 of the contact segment 18. If the securing screw 38 is used, then the inserted pressure relief element 56 can be configured loosely in the cover part 12 without the threaded engagement, because it is held by the retaining element 52. As soon as the pressure in the vessel interior 64 is reduced in this context, the removal of the contact segments 18 from the housing recess 14 in the housing part 10 is possible with the subsequent axial removal of the cover part 12 from the housing part 10 by way of its edge expansion 24.

Such a removal of the cover part 12 can be necessary, for example, for inspection purposes of the vessel interior 64 or if the vessel accommodates a filter (not illustrated), which has to be exchanged, as necessary, for a new element in the event of fouling. However, the illustrated vessel designed as a single tank unit can also be cleaned of contaminants with the removal of the cover part 12. If, nevertheless, the vessel interior 64 is under pressure, for example, by increasing the pressure by way of the inflows and outflows (not illustrated in detail), which empty into the housing part 10, the cover part 12 is pushed, starting from the vessel interior 64, against the contact segments 18 from the underside, so that a sealing closure of the vessel interior 64 relative to the environment is achieved in the area of engagement, to which end the aforementioned sealing device 36 also contributes.

In order to achieve a correspondingly good centering of the contact segments 18 inside the recess 14, the edge expansion 24 of the housing part 12 is provided with an inlet slope 66 in the area, in which the edge expansion 24 opens into the atmosphere, in addition to the insertable contact segment 18 in this area. The inlet slope 66 serves as a centering guide and support and defines a clamping channel that helps to prevent the contact segments 18 from being lifted inadvertently from their housing recess 14 as soon as the vessel interior 64 is suitably pressurized.

In order for the individual contact segments 18 to be able to form a common end stop limiter inside the housing part 10, which provides a support for the cover part 12, end faces 68 of the contact segments 18 extend parallel to one of the central axes as the displacement axis 46 of the cover part 12. This displacement axis in turn is arranged perpendicular to the longitudinal axis 70 of the housing part 10. To avoid overdetermination and to ensure that any super-fine tolerances prevent a system-compatible installation of the contact segments 18 in the housing recess 14, a spacing and/or positioning element 72, which can be made preferably of a sheet metal strip in the form of a spring component (see FIG. 2), is inserted between at least two contact segments 18.

Figure 4:
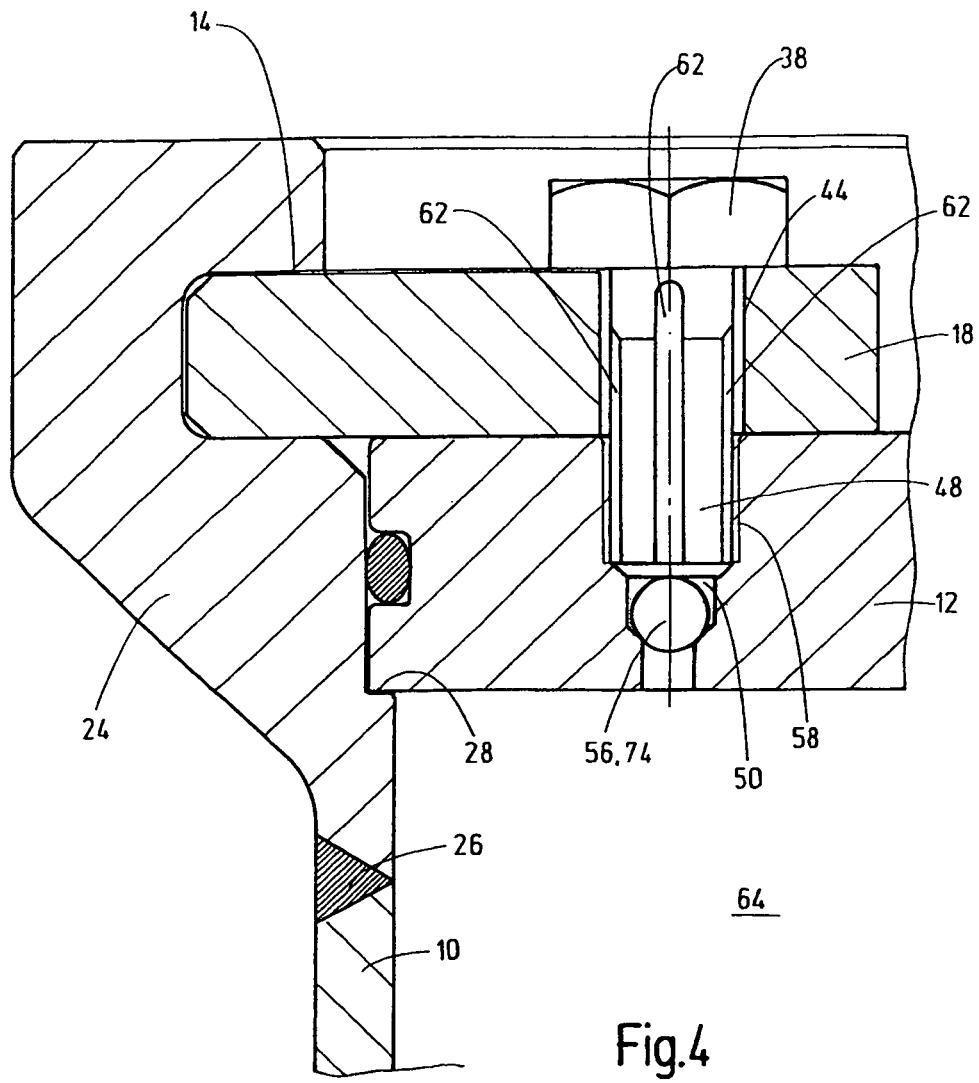
Figure 5:
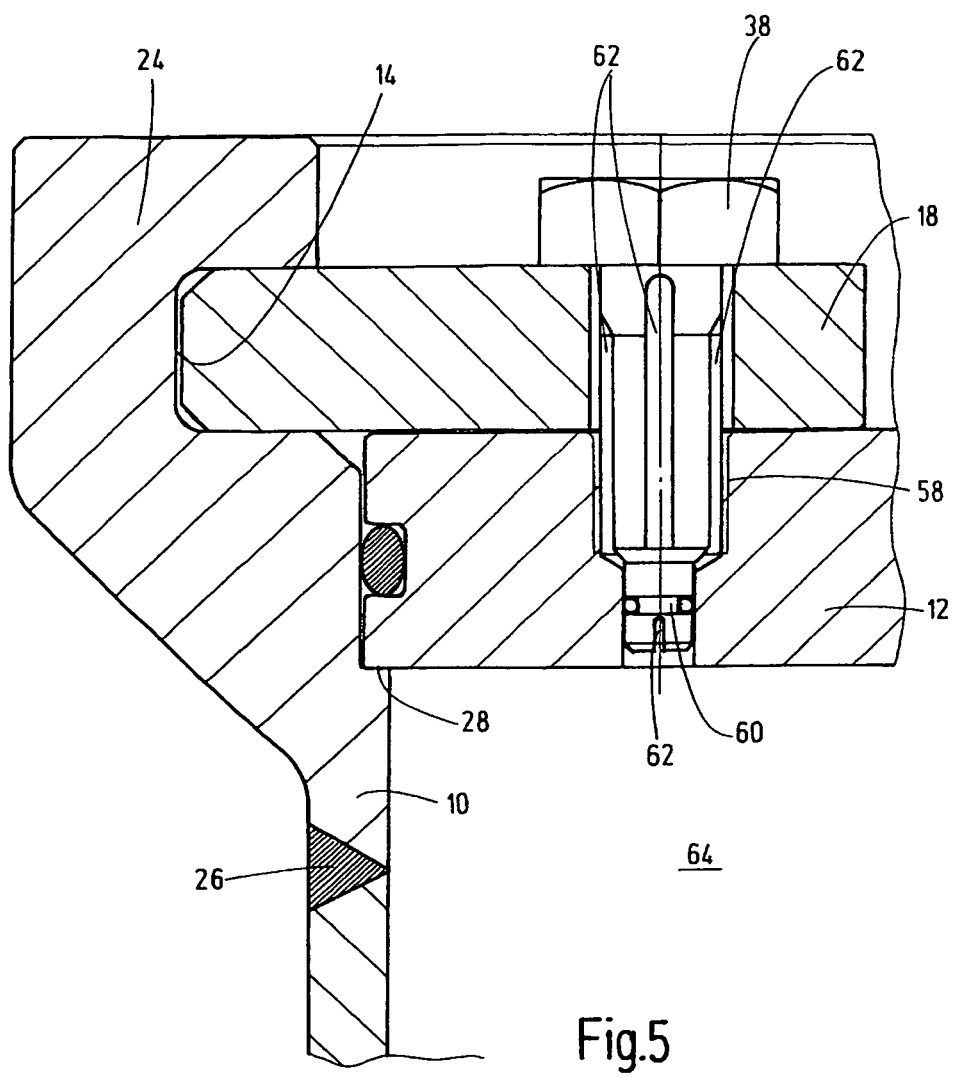

The embodiments according to FIGS. 4 and 5 are explained only insofar as they differ significantly from the embodiment according to FIGS. 1-3. In this case, identical components are provided with the same reference numerals; and the description thereof also apply to the modified embodiments according to FIGS. 4 and 5.

The embodiment according to FIGS. 4 and 5 has a penetration screw as the securing screw 38 extending through the drilled hole 44 without an inside thread in the assigned contact segment 18. The securing screw 38 is guided with its free end 48 along the inside thread 58 in the cover part 12 and serves as the pressure relief device 56—in the nature of non-return ball valve 74 held in the annular cover recess 50 in the cover part 12. At this point, the respective pressure channel 62 extends inside the longitudinal shank of the securing screw 38. The securing screw 38 is unscrewed for a disassembly operation. The non-return ball valve 74 releases the vessel interior 64 relative to the environment by way of the annular recess 50 and the respective pressure channel 62 without being able to issue inadvertently into the atmosphere.

The embodiment in FIG. 5 is modified with respect to that in FIG. 4 to the effect that the non-return ball valve 74 provided as the pressure relief device 56 is replaced with a pressure relief element 56 designed, according to FIG. 3, as an insert. In this case, the upper side of the pressure relief element is connected in one piece directly to the bottom free end 48 of the securing screw 38, however without the contact plate 54. Even in the case of such modified embodiment, when the securing screw is unscrewed, the pressure channel 62 in the insert is connected in a medium-conducting manner by way of the annular channel as the pressure guide groove 60 to the additional axially extending pressure channels 62 inside the securing screw to achieve in this way a pressure reduction in the vessel interior 64 relative to the environment.

In conformity with the solution according to FIG. 5, the inserted relief element 56 according to FIG. 3 does not have to enter into a threaded connection with the cover part 12. Rather, it suffices if such a pressure relief element 56 with its contact plate 54 is supported in a pressure blocking way on the underside 48 of the securing screw 38, provided this screw is screwed into the adjacent contact segment 18. In that pressure-induced raised situation for the pressure relief element 56, the pressure guide groove 60 and the pressure channel 62 have to extend such that the pressure cannot be reduced inadvertently in the vessel interior 64. If, in turn, the pressure relief device 56 is screwed, as described, into the cover part 12, it may also suffice to place, instead of the securing screw 38, a simple securing pin, to show to an operator, for example, the position of the installed pressure relief device 56 in the cover part 12. A preferred embodiment of the vessel according to the invention provides that each of the contact segments 18 has at least one securing screw 38, so that there is no possibility of an incorrect assembly. This feature is especially important if the fast action closure for pressure vessels is used under extremely stringent safety aspects.

While various embodiments have been chosen to illustrate the invention, it will be understood by those skilled in the art that various changes and modifications can be made therein without departing from the scope of the invention as defined in the appended claims.

What is claimed is:

1. A pressure vessel, comprising:
   a tubular housing part having an interior with a housing recess;
   a cover part in said housing part;

contact segments inserted in said housing recess and supporting said cover part in an installed state thereof;
at least one securing screw providing a detachable engagement between said cover part and at least one of said contact segments; and
at least one pressure relief element mounted in said cover part being positioned close to said securing screw and being movable in said cover part between an open position allowing release of an overpressure prevailing in said housing part relative to ambient pressure from said at least one contact segment and a closed position sealing said interior, movement of said pressure relief element between the open and closed positions being controlled by movement of said securing screw via operative engagement of said securing screw and said pressure relief element.

2. A pressure vessel according to claim 1 wherein each of said contact segments have a circular arc shape.

3. A pressure vessel according to claim 1 wherein adjacent ones of said contact segments abut one another at end faces thereof.

4. A pressure vessel according to claim 1 wherein said securing screw extends through said at least one contact segment and is engaged in a respective cover recess in said cover part.

5. A pressure vessel according to claim 1 wherein said contact segments form a common stop limiter inside said housing part for said cover part.

6. A pressure vessel according to claim 1 wherein end faces of said contact segments extend parallel to central axes of said cover part, said central axes being perpendicular to a longitudinal axis of said housing part.

7. A pressure vessel according to claim 6 wherein said contact segments are inserted at least in part to said recess, a last one of said contact segments to be inserted in said recess being inserted parallel to said end faces of adjacent ones of said contact segments.

8. A pressure vessel according to claim 1 wherein said contact segments form an essentially closed contact ring engaging said cover part.

9. A pressure vessel according to claim 1 wherein at least one spacing element is inserted between adjacent end faces of two abutting ones of said contact segments.

10. A pressure vessel according to claim 9 wherein said spacing element comprises a sheet metal strip.

11. A pressure vessel according to claim 1 wherein one of said recesses and said contact segments comprises an inlet slope providing a centering guide and support.

12. A pressure vessel according to claim 1 wherein said recess comprises an inlet slope providing a centering guide and support for said contact segments.

13. A pressure vessel according to claim 1 wherein said cover part comprises at least one seal on an outer circumferential part thereof engaging said housing part.

14. A pressure vessel, comprising:
a tubular housing part having an interior with a housing recess, said housing recess facing radially inwardly;
a cover part in said housing part, with inner and outer surfaces and with a cover recess therein;
contact segments inserted in said housing recess and extending radially inwardly from said housing part to engage and support said outer surface of said cover part, one of said contact segments having an axially extending through bore therein;
a securing screw extending through said through bore and into said cover recess; and
a pressure relief element mounted in said cover recess adjacent said securing screw and movable between an open position allowing fluid communication between said interior and an environment surrounding said housing part via said cover recess and said through bore and a closed position terminating the fluid communication, movement of said pressure relief element between the open and closed positions being controlled by movement of securing screw via operative engagement of said securing screw and said pressure relief element.

15. A pressure vessel according to claim 14 wherein said securing screw is engaged with an internal thread in said through bore.

16. A pressure vessel according to claim 14 wherein said securing screw is engaged with an internal thread in said cover recess.

17. A pressure vessel according to claim 14 wherein said pressure relief element comprises a longitudinal pressure channel and is located adjacent an axial end of said securing screw, positioning of said securing screw controlling movement of said pressure relief element.

18. A pressure vessel according to claim 14 wherein said pressure relief element comprises a ball valve at an axial end of said securing screw, said securing screw having a longitudinal pressure channel therein.

19. A pressure vessel according to claim 14 wherein said pressure relief element is fixed on an axial end of said securing screw, said securing screw and said pressure relief element having longitudinal pressure relief channels therein.

20. A pressure vessel according to claim 1 wherein said pressure relief element allows continuous release of the prevailing overpressure.

* * * * *